US010739993B2

(12) United States Patent
Birchfield et al.

(10) Patent No.: US 10,739,993 B2
(45) Date of Patent: Aug. 11, 2020

(54) SIMULTANEOUS AUTHENTICATION SYSTEM FOR MULTI-USER COLLABORATION

(71) Applicant: Microsoft Technology Licensing, LLC, Redmond, WA (US)

(72) Inventors: Stanley T. Birchfield, Sammamish, WA (US); Avronil Bhattacharjee, Redmond, WA (US); Kevin Juho Venalainen, Seattle, WA (US); Arthur Baker, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 15/410,357

(22) Filed: Jan. 19, 2017

(65) Prior Publication Data
US 2018/0203601 A1    Jul. 19, 2018

(51) Int. Cl.
*G06F 3/0488* (2013.01)
*G06F 21/31* (2013.01)
(Continued)

(52) U.S. Cl.
CPC ........ *G06F 3/04886* (2013.01); *G06F 3/0481* (2013.01); *G06F 3/0482* (2013.01);
(Continued)

(58) Field of Classification Search
CPC .. G06F 3/04886; G06F 3/0481; G06F 3/0482; G06F 3/0484; G06F 21/31;
(Continued)

(56) References Cited

U.S. PATENT DOCUMENTS 8,502,816 B2    8/2013   Butler et al.
9,374,233 B2    6/2016   Narayanan
(Continued)

FOREIGN PATENT DOCUMENTS

EP          2077496 A1     7/2009
WO     2015005959 A1     1/2015

OTHER PUBLICATIONS

Peralta, Raquel Torres, "Recognizing User Identity by Touch on Tabletop Displays: An Interactive Authentication Method", In Dissertation of the University of Arizona., Sep. 7, 2012, 87 pages.
(Continued)

*Primary Examiner* — Andrew T Chiusano
(74) *Attorney, Agent, or Firm* — Alleman Hall Creasman & Tuttle LLP

(57) ABSTRACT

A computing device includes a touch-sensitive user interface configured to present a unified collaborative session for two or more users, and an authentication module configured to simultaneously identify and authenticate multiple users physically co-located within a collaborative environment, allowing each of the multiple users to interact with the touch-sensitive user interface. A content module is configured to simultaneously provide one or more content portals within the unified collaborative session for each authenticated user. Each content portal is configured to enable an authenticated user to access, retrieve, and present user-owned content files within the unified collaborative session. In this way, multiple users may simultaneously access, retrieve, and present their own content files on a single computing device.

20 Claims, 6 Drawing Sheets

(51) Int. Cl.
| | |
|---|---|
| *G06F 3/0481* | (2013.01) |
| *G06F 3/0484* | (2013.01) |
| *G06F 3/0482* | (2013.01) |
| *H04L 29/06* | (2006.01) |
| *G06F 21/32* | (2013.01) |
| *G06Q 10/10* | (2012.01) |

(52) U.S. Cl.
CPC ............ *G06F 3/0484* (2013.01); *G06F 21/31* (2013.01); *G06F 21/32* (2013.01); *G06Q 10/101* (2013.01); *H04L 63/08* (2013.01); *H04L 63/105* (2013.01)

(58) Field of Classification Search
CPC ....... G06F 21/32; H04L 63/08; H04L 63/105; G06Q 10/101
See application file for complete search history.

(56) References Cited

U.S. PATENT DOCUMENTS

| | | | |
|---|---|---|---|
| 2006/0259755 A1* | 11/2006 | Kenoyer | G06F 21/32 713/1 |
| 2007/0226636 A1* | 9/2007 | Carpenter | G06F 3/048 715/751 |
| 2008/0003559 A1 | 1/2008 | Toyama et al. | |
| 2010/0079369 A1* | 4/2010 | Hartmann | G06F 3/0416 345/156 |
| 2011/0197263 A1* | 8/2011 | Stinson, III | G06F 3/011 726/4 |
| 2011/0239117 A1* | 9/2011 | Sutton | G06F 3/0486 715/706 |
| 2011/0239129 A1 | 9/2011 | Kummerfeld et al. | |
| 2013/0091440 A1* | 4/2013 | Kotler | G06Q 10/10 715/753 |
| 2013/0147905 A1* | 6/2013 | Vivekanandan | H04N 7/157 348/14.08 |
| 2014/0033067 A1* | 1/2014 | Pittenger | G06F 21/606 715/751 |
| 2014/0122599 A1* | 5/2014 | Park | H04L 12/1818 709/204 |
| 2014/0164984 A1* | 6/2014 | Farouki | G06F 3/0481 715/784 |
| 2014/0165152 A1* | 6/2014 | Farouki | H04N 7/15 726/4 |
| 2015/0007055 A1 | 1/2015 | Lemus et al. | |
| 2015/0106739 A1* | 4/2015 | Tan | G06F 3/0484 715/750 |
| 2015/0149929 A1* | 5/2015 | Shepherd | H04L 65/403 715/753 |
| 2015/0264054 A1* | 9/2015 | DeLuca | H04L 63/105 726/28 |
| 2017/0220546 A1* | 8/2017 | Codrington | G06F 3/0484 |

OTHER PUBLICATIONS

Kim, et al., "Interaction Workspaces: Identity Tracking for Multi-user Collaboration on Camera-based Multi-touch Tabletops", In Proceedings of the IEEE VisWeek Workshop on Collaborative Visualization on Interactive Surfaces, Nov. 4, 2016, 4 pages.

Nguyen, Vu Anh, "Microsoft shows off the future of collaboration with Surface Hub at CeBIT 2016", https://www.winbeta.org/news/surface-hub-goes-public-germany, Published on: Mar. 16, 2016, 8 pages.

Inkpen, et al., "Collaboration around a Tabletop Display: Supporting Interpersonal Interactions", In Technical report, Simon Fraser University, Nov. 4, 2016, 9 pages.

"International Search Report and Written Opinion Issued in PCT Application No. PCT/US218/012446", dated Mar. 12, 2018, 11 Pages.

\* cited by examiner

SIMULTANEOUS AUTHENTICATION SYSTEM FOR MULTI-USER COLLABORATION

BACKGROUND

Large-format display devices may be utilized in collaborative environments for presenting and sharing content. Multiple attendees of a meeting in such a collaborative environment may wish to present their own content files on a single shared display device.

DETAILED DESCRIPTION

Figure 1:
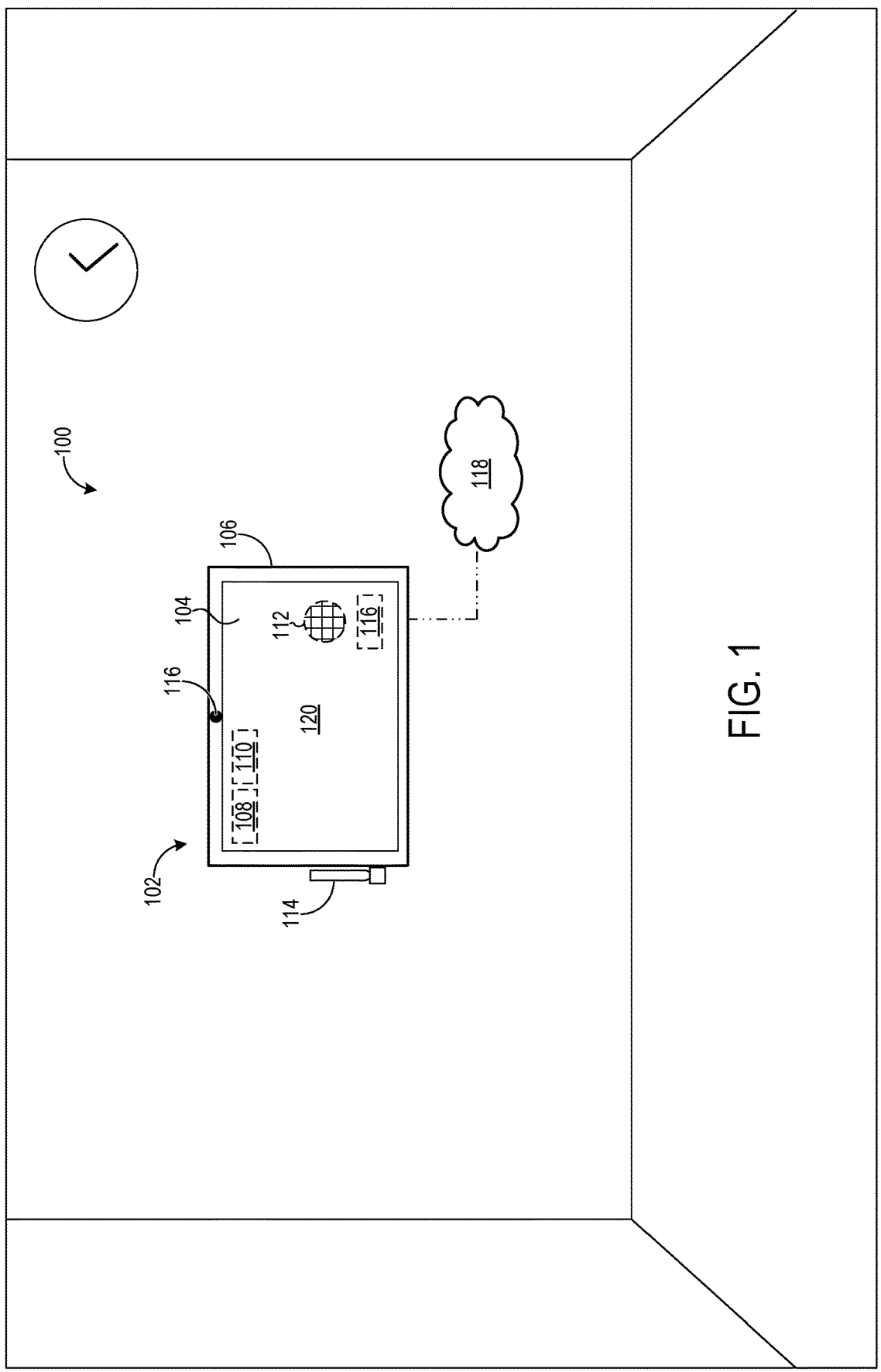
FIG. 1 shows an example collaborative environment including a touch-sensitive display device.

Accessing a computing device is typically an individual affair. A single user logs on to the computing device and has access and control over their account. Some computing devices support multiple user accounts. A second user may log on to the same computing device, but the first user is typically either logged out or their account otherwise restricted from the second user.

Numerous emerging computing platforms are specifically focused on collaboration, including computing devices associated with large-format, touch-sensitive displays. To provide a truly collaborative environment on a communal computing device, multiple users must be able to access their own content. For example, users may bring content to a collaborative meeting, edit that content, and save or otherwise distribute that content for future use.

For multiple users, collaborative use of a computer typically means that one user must log out while another user logs in. Multiple users may load their own content onto a device, but there is still typically one open user account at a time, and thus only one user may operate within their native system. Other users thus do not have access to their own remote accounts, preferences, etc. These individualized accounts, preferences, and other associated personal configurations are referred to collectively as a user's context. At best, a computing device may allow for fast-toggling between accounts (i.e., one user logging off to enable another to log on). However, a single-user computing device does not allow for simultaneous presentation of content for multiple users within the context of their own account.

Further, if a user brings their own computing device to a collaborative session, or otherwise logs into a shared computing device, their device security may be compromised if they desire to leave the session while still presenting their content. Additionally, if multiple users are editing a content file open under one account, edits are likely to be attributed to the holder of the open account. This may cause confusion for a user viewing the content file at a later time point, particularly if that user was not in attendance at the collaborative session.

This specification describes systems and methods for a computing device configured to provide a unified collaborative session for two or more users. Multiple users may simultaneously access their own accounts and content files, and multiple applications may be run in the context of different users. Multiple users may log in concurrently without toggling between users or requiring users to log out.

Multiple users may be locally identified and authenticated on one common physical device. Permissions may be managed for each user's content files in order to reduce access to a file if the user steps away from the collaborative session. Edits may be tracked by user, and content files may be distributed to roster members for a collaborative session. In this way, multiple users may be authenticated simultaneously into a single collaborative session so that each user has a portal to their own content and can seamlessly bring their content to the collaboration.

FIG. 1 shows an example collaborative environment 100 that includes a computing device 102. Collaborative environment 100 is shown in the form of a conference room, but may assume any suitable form. Computing device 102 may include one or more touch-sensitive user interfaces 104. Touch-sensitive user interface 104 may be operable to output graphical content and carry out various computing device functions. To this end, FIG. 1 shows the inclusion of a display device 106, and a processor 108 and memory 110 (both schematically depicted), in computing device 102. Memory 110 may hold instructions executable by processor 108 to effect the approaches described herein. Display device 106 may be connected to an image source, such as computing device 102. Display device 106 may have a diagonal dimension greater than 1 meter, for example. In other, particularly large-format embodiments, the diagonal dimension may be 55 inches or greater.

Touch-sensitive user interface 104 may be configured to receive user input in a variety of forms. As an example, FIG. 1 depicts the inclusion of a touch sensor 112 in touch-sensitive user interface 104 configured to receive touch and/or hover input. Touch-sensitive user interface 104 may employ any suitable sensing technologies, including but not limited to capacitive, resistive, acoustic, frustrated total internal reflection (FTIR) infrared sensing technologies. Touch-sensitive user interface 104 may be configured to enable multi-touch sensing functionality. Computing device 102 may thus receive multi-touch input from touch-sensitive user interface 104, process the multi-touch input, and produce appropriate graphical output in response, which may then be output to display device 106.

Further, touch-sensitive user interface 104 may additionally or alternatively be configured to receive input from peripheral devices, such as a mouse, keyboard, gamepad, microphone, etc. For example, touch sensor 112 may be configured to receive input from one or more styluses 114. As an example, an electrostatic link and/or radio link may be established between touch sensor 112 and a conductive element (e.g., electrode tip) of a stylus 114. Various suitable data/signals may be transmitted along such a link, including but not limited to information (e.g., capacitance measurements) that enables determination of one or more coordinates (e.g., x, y, z-coordinates) of stylus 114 relative to touch-sensitive user interface 104.

Computing device 102 may include one or more cameras 116. Camera 116 may be an infrared, color, stereoscopic, and/or depth camera, and may be used for machine vision and/or gesture recognition. Camera 116 may thus provide information regarding the locations, identities, and actions of one or more users within collaborative environment 100. Although depicted as being physically coupled to computing device 102, camera 116 may be located elsewhere within collaborative environment 100. Additionally, although depicted as viewing outward from display device 106 into collaborative environment 100, camera 116 may be utilized from other perspectives.

Computing device 102 is depicted coupled to network 118 and may be of any suitable type (e.g., wired, wireless, local area network, wide area network, cloud network). Network 118 may be used to communicatively couple computing device 102 to one or more additional computing devices, servers, etc. Network 118 may allow users to access content for presentation on display device 106.

Computing device 102 may be configured to present a unified collaborative session 120. Each unified collaborative session may be a limited duration event (e.g., a computing session occurring during a meeting) wherein touch-sensitive user interface 104 is used for the presentation of content files. Unified collaborative session 120 may be configured to allow two or more users to simultaneously interact with touch-sensitive user interface 104. Further, unified collaborative session 120 may enable each user to concurrently access, retrieve, and present their own user-owned content files without having to switch back and forth between walled-off user accounts associated with the individual participants. Additionally, unified collaborative session 120 may enable each user to concurrently operate the same application with different sets of user preferences. Computing device 102 may track, record, and/or store user activity over the course of a unified collaborative session 120.

Figure 2:
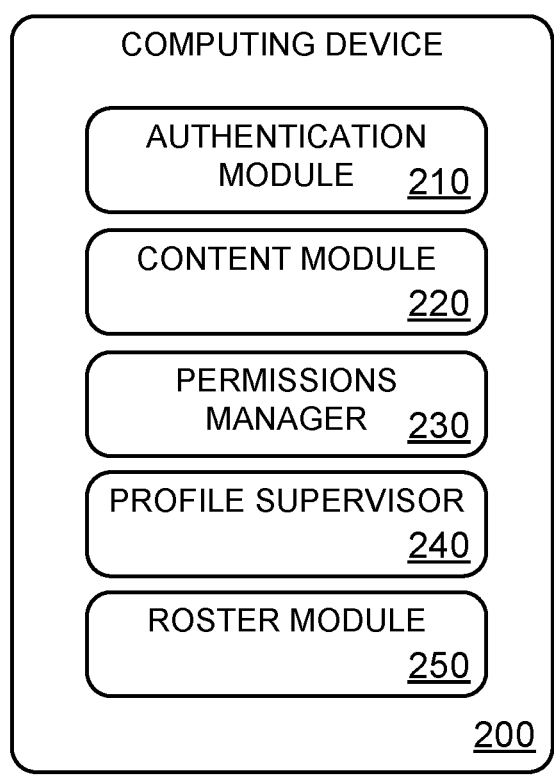
FIG. 2 shows a simplified schematic illustration of an example computing device that may be used in connection with the systems and methods described herein.

FIG. 2 shows a non-limiting embodiment of a computing device 200. Computing device 200 may be an example of computing device 102, and may similarly be associated with the other components described with regard to FIG. 1 or their equivalents. As depicted, computing device 200 includes an authentication module 210, a content module 220, a permissions manager 230, a profile supervisor 240, and a roster module 250.

Authentication module 210 may be configured to simultaneously identify and authenticate multiple users physically co-located within a collaborative environment, i.e., physically present so that each of the multiple users can interact with the touch-sensitive user interface. For example, authentication module 210 may include one or more cameras, such as camera 116 depicted in FIG. 1. A user entering the collaborative environment may be imaged by the one or more cameras. Image data may then be compared to user authentication templates (e.g., using facial recognition software) in order to identify and/or authenticate the user.

In addition to, or as an alternative to one or more cameras, authentication module 210 may have one or more fingerprint readers, near-field communication (NFC) readers, radio frequency identifiers (RFID), Bluetooth devices, voice recognition devices, QR code scanners and/or presenters, retinal scanners, etc. A user may engage with authentication module 210 via a smartphone or other hand-held device. For example, a smartphone registered to a user may be directly authenticated via Bluetooth, by tapping the smartphone against an NFC reader, etc. Indirectly, a user may be authenticated by requesting authentication from the computing device and then entering a PIN via the smartphone and/or entering a fingerprint via the smartphone. In some examples, a user may be authenticated by entering a user ID and password, etc. into computing device 200.

In some examples, authentication module 210 may be physically co-located with the touch-sensitive user interface within a collaborative environment. Additionally or alternatively, authentication module 210 may be located outside the collaborative environment, e.g., external to a door or other entryway to the collaborative environment. In some examples, the steps of identification and authentication may be divided across two or more devices. For example, a camera may be used in initial identification of a user by comparing images of the user to a shared pool of facial images available via a networked computing device. A second device, such as a smartphone, fingerprint reader, etc. may then be used to authenticate the user.

If a user cannot be recognized and/or authenticated via authentication module 210, the user may be presented with an opportunity to enroll as an authenticated user of the display device and/or unified collaborative session. For example, the user may provide a means of authentication (e.g., password or two-factor identification via smartphone). Once initially authenticated, additional identification/authentication information may be acquired by authentication module 210. For example, the newly authenticated user may be asked to stare into a camera for a duration, install identification information on their smartphone, or submit a fingerprint scan.

Content module 220 may be configured to simultaneously provide one or more content portals within the unified collaborative session for each authenticated user, each content portal configured to enable an authenticated user to access, retrieve, and present user-owned content files within the unified collaborative session. For example, an authenticated user may configure each content portal to provide access to a different set or subset of user-owned content files. Two or more user-owned content files may be opened simultaneously within a content portal and/or two or more content portals may be opened simultaneously, each content portal presenting two or more user-owned content files.

Figure 3:
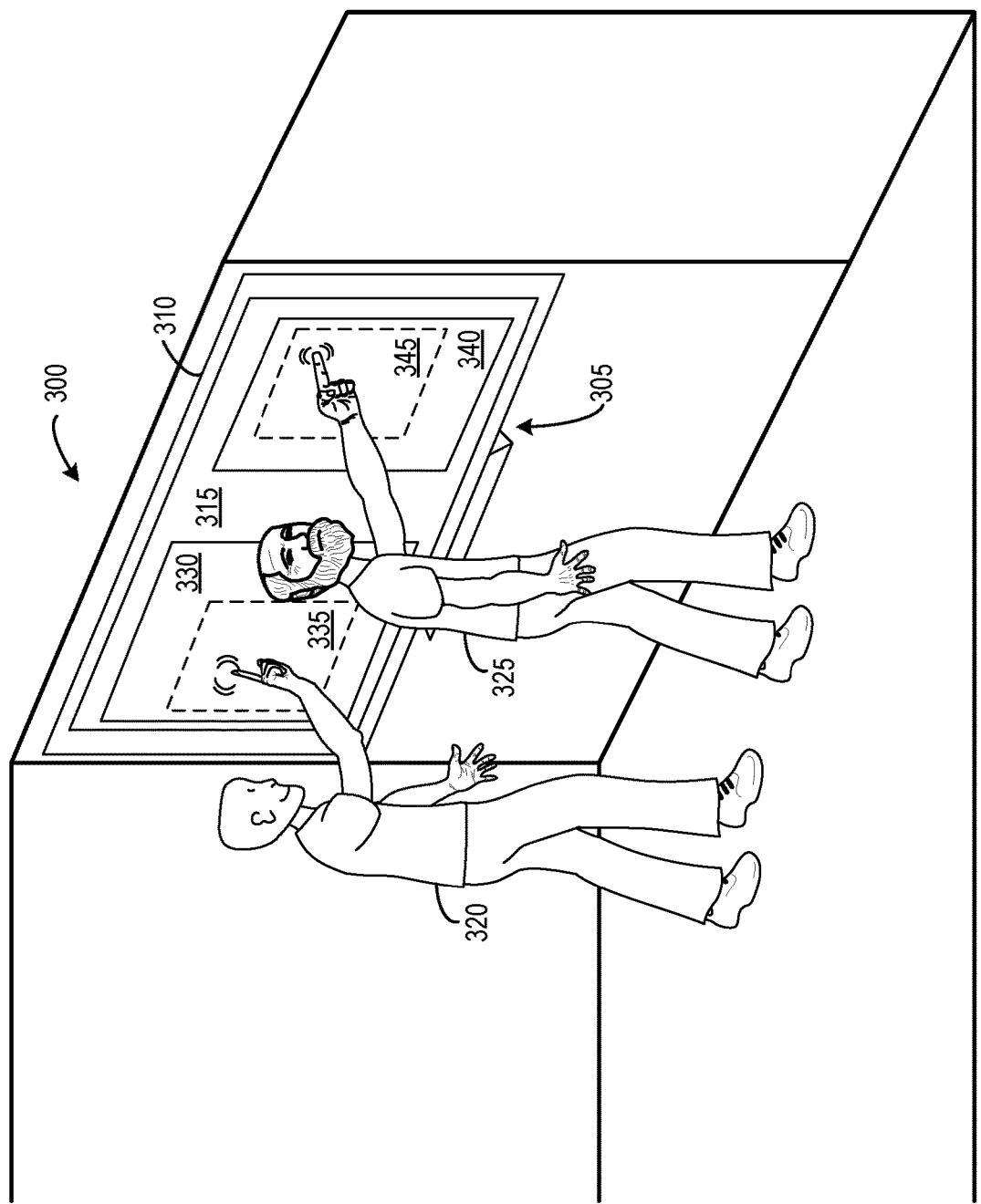
FIG. 3 illustrates a pair of authenticated users simultaneously interacting with a touch-sensitive display device.

As an example, FIG. 3 depicts a collaborative environment 300 including a computing device 305. Computing device 305 includes a touch-sensitive user-interface 310 configured to present a unified collaborative session 315. A first user 320 and a second user 325 are shown simultaneously interacting with touch-sensitive user-interface 310. First user 320 has opened a content portal 330 and has accessed a user-owned content file 335. Second user 325 has opened a content portal 340 and has accessed a user-owned content file 345.

Once a content portal has been opened, each authenticated user may navigate to user-owned content files stored locally on the computing device, stored on a computing device on a shared network, stored on a computing device on a separate network, stored on a cloud server, etc. User-owned content files that are stored remotely may be accessed via a browser, via a file-sharing app, via a file-editing app, via a remote desktop app, etc. In some examples, an authenticated user may push files from a near-field or networked device, such as a laptop computer or tablet computer, to content module 220 for local storage and/or access at computing device 200.

A user may manage a user account for computing device 200 such that authentication into a unified collaborative session is sufficient to log in to some or all of the user's file storage locations. In other words, once the user has been authenticated once, additional logins to access user-owned content files may be unnecessary. For example, an authenticated user may interact with touch-sensitive user interface to reveal a dropdown menu of links to personalized content and/or content storage locations.

Once a user-owned content file is selected, the file may be retrieved for presentation on a touch-sensitive display device. The storage location of the user-owned content file may be maintained, and/or a copy of the user-owned content file may be cached or stored locally, either directly at the computing device or at another storage device networked to the computing device.

As shown in FIG. 3, two users may simultaneously access and present different user-owned content files at a touch-sensitive display device. However, in some scenarios, only one user may present user-owned content files while multiple authenticated users are engaged in a collaborative session. Permissions manager 230 may limit access to a user-owned content file by authenticated users that are not the owner of a user-owned content file. For example, some or all of a user-owned content file may be editable only by the file's owner.

In some examples, a first user may retrieve a user-owned content file and allow a second authenticated user to access the file. The shared user-owned content file may be presented to both the first and second authenticated users simultaneously via the touch-sensitive display device, or may be presented to each authenticated user via their own content portal. Permissions manager 230 may determine how each authenticated user may interact with a particular user-owned content file. For example, first user 320 may share content file 335 with second user 325. First user 320 may have full permission to access, edit, or save changes to user-owned content file 335, while second user 325 may have limited permissions to access, edit, and/or save changes to user-owned content file 335.

In some examples, the permissions for a user-owned content file may be default conditions indicated by permissions manager 230. Additionally or alternatively, the user of each user-owned content file may determine permissions for their own user-owned content files. In some examples, a user-owned content file may be shared, and the secondary user granted joint-ownership of the file. In some scenarios, one or more authenticated users may edit a content file owned by another user who has allowed such access via permissions manager 230. The editors may thus become joint-owners of the user-owned content file.

If a shared user-owned content file is edited by more than one authenticated user, edits by each authenticated user may be tagged and/or tracked within the user-owned content file. For example, if the user-owned content file is pushed to and edited within multiple content portals, the edited content files may be merged at the conclusion of the unified collaborative session. Edits to a user-owned content file may be time-stamped. Edits may be tagged and/or tracked based on the identity of the authenticated user associated with the content portal within which edits are made. Edits within a content portal may be identified based on a screen location of the content portal. If one copy of the user-owned content file is presented for editing, the identity of an editor may be determined based on information derived from components of the authentication module (e.g., cameras, proximity sensors, touch sensors). In some examples, each authenticated user may be associated with a unique stylus that is used to interact with the touch-sensitive display.

Edited versions of a user-owned content file may be saved to the location of the original file, and/or may be saved to one or more additional locations based on the preferences of the content file's owner. A shared version of the user-owned content file may be distributed to other editors. In some examples, the shared version may allow a user to view all edits to the content file; additionally or alternatively, each user may only be allowed to view their own edits and/or a subset of edits. File distribution may be automatically determined for the unified collaborative session, determined by the original file owner, determined at the point of distribution, etc.

Profile supervisor 240 may be configured to determine an authenticated user's status relative to the collaborative environment, and may be further configured to adjust access to an authenticated user's content portal based on the authenticated user's status. For example, permissions associated with the authenticated user's content portal may be adjusted based on the authenticated user's level of engagement with a collaborative session.

The authenticated user's status may be detected dynamically, and may be continuously and/or periodically updated. For example, the authenticated user's status may be determined based on signals received via a touch-sensitive user interface, authentication module 210, and/or other hardware components of computing device 200. In examples wherein one or more cameras are mounted facing outwards from the touch-sensitive user interface (e.g., camera 116), an authenticated user may be assigned a first status when facing the camera, and thus facial features are recognizable and authenticatable by authentication module 210. The authenticated user may be assigned a second status when facing away from the camera, and thus facial features are not recognizable or authenticatable.

In some examples, an authenticated user may be assigned a status based on a proximity to the touch-sensitive user interface. For example, an authenticated user may be assigned a first status when located within a threshold distance of the touch-sensitive user interface and a second status when located outside the threshold distance. An authenticated user operating a stylus may be assigned a first status based on the stylus being active and/or within a threshold distance of the touch-sensitive user interface and assigned a second status based on the stylus being inactive and/or outside a threshold distance of the touch-sensitive user interface.

Additionally or alternatively, an authenticated user may be assigned a status based on whether or not the authenticated user remains within the collaborative environment. For example, an authenticated user may be assigned a first status while situated within the collaborative environment and a second status upon exiting the collaborative environment.

In the above described examples, an authenticated user is assigned a binary status by profile supervisor 240, but in some examples, profile supervisor 240 may assign a gradated status to an authenticated user. For example, an authenticated user may be assigned a first status based on active engagement with a touch-sensitive user interface, a second status based on the authenticated user being proximal to, but not actively engaged with touch-sensitive user interface, a third status based on the authenticated user being located within the collaborative environment but not proximal to touch-sensitive user interface, and a fourth status based on the authenticated user exiting the collaborative environment. An authenticated user may be enabled to actively indicate and/or adjust their status, for example, an authenticated user may actively indicate to maintain a second status even if actively engaged with touch-sensitive user interface. An authenticated user may also actively indicate to maintain a first status even if not actively engaged with touch-sensitive user interface, thus maintaining a level of access while the authenticated user is logged in to the collaborative session.

Figure 4B:
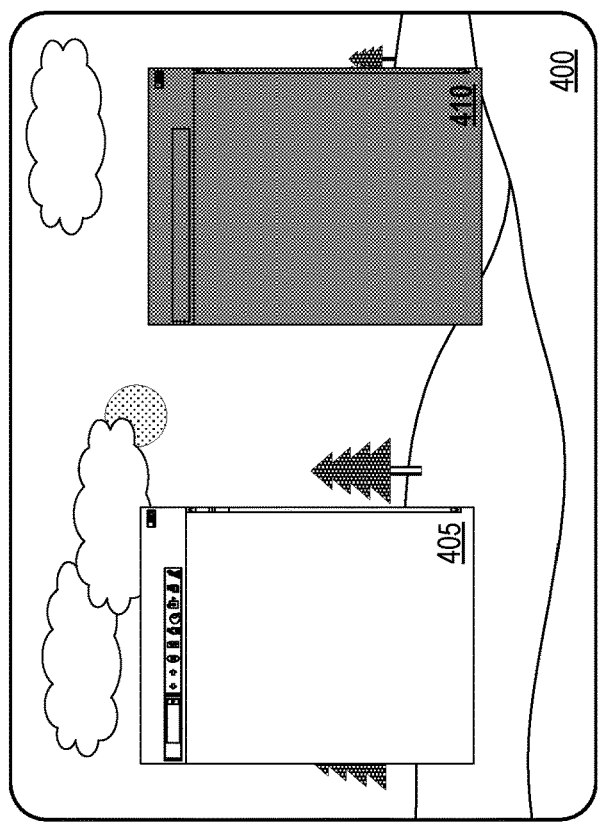
FIGS. 4A-4B illustrate a unified collaborative session for two authenticated users.
Figure 4A:
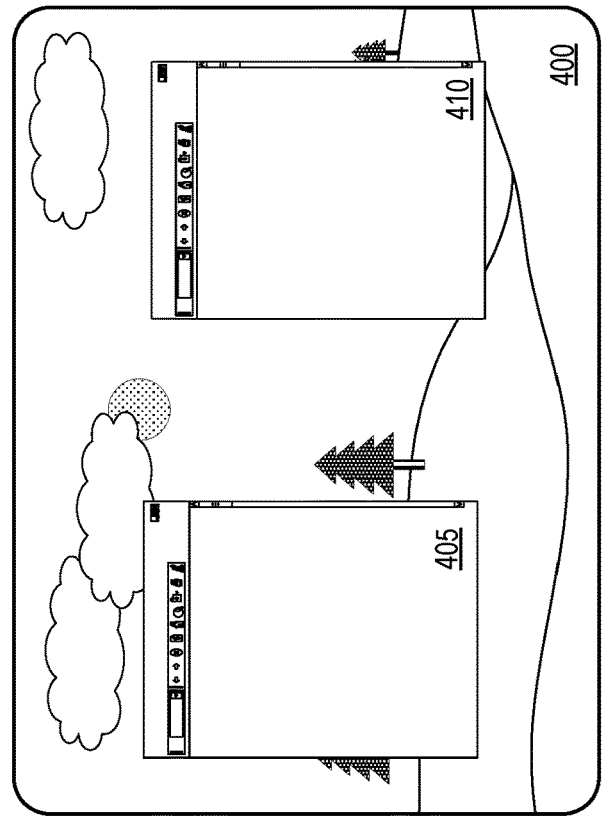

Adjusting access to an authenticated user's content portal based on the authenticated user's status may include reducing access to the authenticated user's content. For example, profile supervisor 240 may indicate to permissions manager 230 to adjust permissions for user-owned content files based on the authenticated user's status. As an example, when an authenticated user's status changes from a first status (more actively engaged) to a second status (less actively engaged) permissions for the other members of the collaborative session may be adjusted to reduce access to user-owned content files. For example, a content file and/or content portal may be greyed out, locked, shifted to read-only status, etc. responsive to a status change for the authenticated user who owns the content files. In this way, the security of the content files is increased when the authenticated user is less actively engaged with touch-sensitive user interface. FIGS. 4A-4B illustrate such an example. FIGS. 4A-4B show a unified collaborative session 400 featuring a first content portal 405 affiliated with a first authenticated user, and a second content portal 410 affiliated with a second authenticated user. In FIG. 4A, both the first and second authenticated users are actively engaged, and thus both first content portal 405 and second content portal 410 are active. In FIG. 4B, the second authenticated user is no longer actively engaged. As such, second content portal has been greyed-out. The first authenticated user remains actively engaged, and thus first content portal 405 is active, but the first authenticated user is not able to interact with user-owned content files presented in the second content portal.

As described with regard to permissions manager 230, status adjustments made by profile supervisor 240 may result in default permission adjustments, and/or the user of each user-owned content file may determine permission adjustments for their own user-owned content files. Permission adjustments may be applied to one or more of touch-based editing, stylus-based editing, voice-based editing, etc. in the context of a content portal and/or a user-owned content file. In some examples, permission adjustments may be applied unequally to user-owned content files open within the same content portal (e.g., one file may be greyed-out while another file remains active).

Roster module 250 may be configured to indicate authenticated users for a unified collaborative session, and to enable an authenticated user to simultaneously distribute one or more user-owned content files to each authenticated user for the unified collaborative session. Following authentication, a profile for the authenticated user may be displayed on the display device within a visual roster generated by roster module 250. For example, a user name and thumbnail photograph may be displayed. If the user has not assigned a profile to the device and/or to the unified collaborative session, a generic icon for the authenticated user may be displayed within the visual roster. The authenticated user may then create or assign a profile to the visual roster.

Figure 5:
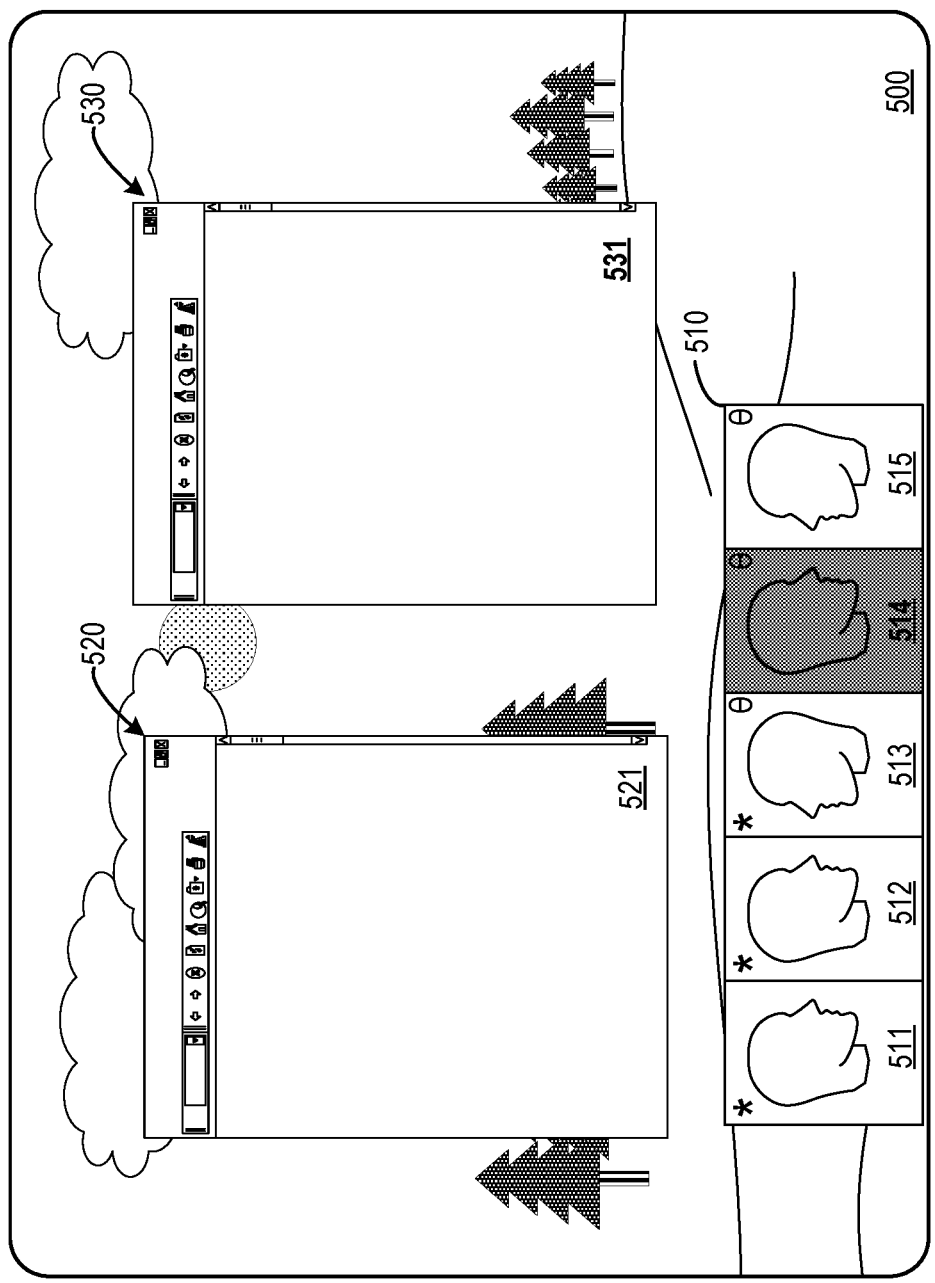
FIG. 5 illustrate a unified collaborative session including a visual roster.

The visual roster may be displayed on the touch-sensitive user interface, either throughout the unified collaborative session or responsive to input from an authenticated user. For example, FIG. 5 illustrates a unified collaborative session 500 featuring a visual roster 510. Users viewing the unified collaborative session remotely (e.g., located external to the collaborative environment and viewing content presented on the display device) may also view the visual roster, thus providing context for the unified collaborative session.

Each authenticated user for a unified collaborative session may be indicated within a visual roster that is visible and accessible at the touch-sensitive user interface. For example, visual roster 510 indicates thumbnail profiles for authenticated users 511, 512, 513, 514, and 515. The thumbnail profiles for each authenticated user may enable an authenticated user to select the user's profile within the visual roster. Selection of a user's profile may reveal a dropdown menu of links, such as links to content files, storage modules, etc. If a user exits or otherwise disengages the unified collaborative session, their thumbnail profile may be minimized or greyed-out, as shown for user 514.

In some examples, a user-owned content file accessed and presented during the unified collaborative session may be distributed to one or more members of the visual roster by the content file owner. For example, unified collaborative session 500 includes a first content portal 520 that is associated with user 511 and a second content portal 530 that is associated with user 515. User 511 may distribute a content file 521 from content portal 520 to all of or a subset of the other members of visual roster 510. User 515 may distribute content file 531 from content portal 530 to the same members of visual roster 510 that received content file 521, or to a different set of members of visual roster 510.

A session agenda may be established prior to each unified collaborative session, indicating invited participants. A session leader, who may or may not be a participant in the unified collaborative session, may generate a session agenda, may add participants to a prospective roster, and may indicate permissions associated with participants (e.g., presenter, collaborator, guest). In some examples, a participant on the prospective roster may add additional participants to the prospective roster prior to the unified collaborative session and/or following authentication into the unified collaborative session. Each session agenda, and thus each prospective roster may be uniquely associated with a particular unified collaborative session.

The session agenda may indicate a specific collaborative environment for the unified collaborative session, including a specific computing device to be used during the session. The session agenda and prospective roster may be loaded onto the indicated session computing device. Further, for examples where user authentication is based on biometric identification, biometric profiles for each member of the prospective roster may be pre-loaded onto the session computing device. For example, biometric profiles for the prospective roster may be downloaded from a network database that includes biometric profiles for all possible authenticatable users. Thus, it is not necessary to load all possible biometric profiles onto each computing device that may be used for an authenticated collaborative session. Further, it is not necessary to compare data received for a user to all possible biometric profiles, whether stored locally or remotely. For groups with large roster databases (e.g., large companies, universities) this may reduce local data storage demands as well as increase the speed of authentication. Following the conclusion of a unified collaborative session, the pre-loaded biometric profiles may be deleted from the computing device. In one configuration, a user may pre-load their biometric profile on a computing device. For example, a user who frequently attends unified collaborative sessions in a particular collaborative environment may elect to load and maintain their biometric profile within that collaborative environment for ease of future authentication.

Participants on the prospective roster for a unified collaborative session may receive communications indicating the session agenda, as well as the prospective roster for the unified collaborative session. Participants may thus communicate among each other and share user-owned content files in advance of the unified collaborative session. The session agenda may further indicate one or more storage modules for the unified collaborative session. The storage modules may allow participants to pre-load user-owned content files on to the session computing device, and may further allow participants to view pre-loaded user-owned content files prior to the unified collaborative session. In some examples, each participant may link a personal storage module to the unified collaborative session, or otherwise divert uploaded content files to selected file storage location(s).

As described herein, edits made to each user-owned content file during a unified collaborative session may be tracked, timestamped, and associated with a session participant. Such edits or other participation (e.g., voice recordings, gestures) associated with a user-owned content file may be collated by roster module 250. In some examples, session participants who become associated with a user-owned content file in this way may be denoted within the visual roster, and/or may be collated such that a list of associated participants is appended to the user-owned content file. For example, FIG. 5 depicts users 511, 512, and 513 with an (*) to signify association with a first user-owned content file (content file 521), while users 513, 514, and 515 are depicted with a (θ) to signify association with a second user-owned content file (content file 531). During or following the collaborative session, the user-owned content file may be distributed to storage modules for the associated participants and/or the entire roster for a unified collaborative session, either automatically or based on a command received by the content file owner. In some examples, content files may be distributed to users who were on the prospective roster for the unified collaborative session, but were not authenticated as users during the unified collaborative session. If edits to a user-owned content file occur after an authenticated user exits from a meeting, the authenticated user may receive a version comprising updated edits and/or may receive notifications that such a version is available to access and/or download.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
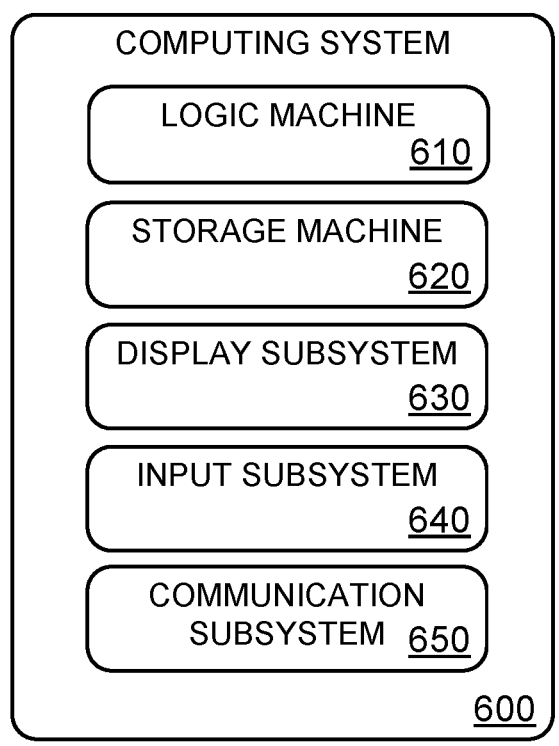
FIG. 6 shows a simplified schematic illustration of an example computing system that may be used in connection with the systems and methods described herein.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 610 and a storage machine 620. Computing system 600 may optionally include a display subsystem 630, input subsystem 640, communication subsystem 650, and/or other components not shown in FIG. 6.

Logic machine 610 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 620 includes one or more physical devices configured to hold instructions executable by the logic machine to implement the methods and processes described herein. When such methods and processes are implemented, the state of storage machine 620 may be transformed—e.g., to hold different data.

Storage machine 620 may include removable and/or built-in devices. Storage machine 620 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 620 may include volatile, nonvolatile, dynamic, static, read/write, read-only, random-access, sequential-access, location-addressable, file-addressable, and/or content-addressable devices.

It will be appreciated that storage machine 620 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 610 and storage machine 620 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 610 executing instructions held by storage machine 620. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 630 may be used to present a visual representation of data held by storage machine 620. This visual representation may take the form of a graphical user interface (GUI). As the herein described methods and processes change the data held by the storage machine, and thus transform the state of the storage machine, the state of display subsystem 630 may likewise be transformed to visually represent changes in the underlying data. Display subsystem 630 may include one or more display devices utilizing virtually any type of technology. Such display devices may be combined with logic machine 610 and/or storage machine 620 in a shared enclosure, or such display devices may be peripheral display devices.

When included, input subsystem 640 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 650 may be configured to communicatively couple computing system 600 with one or more other computing devices. Communication subsystem 650 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In one example, a computing device, comprises: a touch-sensitive user interface configured to present a unified collaborative session for two or more users; an authentication module configured to simultaneously identify and authenticate multiple users physically co-located within a collaborative environment such that each of the multiple users can touch interact with the touch-sensitive user interface; and a content module configured to simultaneously provide one or more content portals within the unified collaborative session for each authenticated user, each content portal configured to enable an authenticated user to access, retrieve, and present user-owned content files within the unified collaborative session. In such an example, or any other example, a first authenticated user may additionally or alternatively push a user-owned content file to a second authenticated user, so that both the first and second authenticated users may simultaneously interact with one user-owned content file. In any of the preceding examples, or any other example, the first and second authenticated users may additionally or alternatively simultaneously interact with different versions of the same user-owned content file. In any of the preceding examples, or any other example, the different versions of the same user-owned content file may additionally or alternatively be merged following the unified collaborative session. In any of the preceding examples, or any other example, edits to the user-owned content file may additionally or alternatively be associated with each authenticated user. In any of the preceding examples, or any other example, the second authenticated user may additionally or alternatively have limited permissions pertaining to the user-owned content file as compared to the first authenticated user. In any of the preceding examples, or any other example, each authenticated user may additionally or alternatively open a first application within the content portal, and may additionally or alternatively operate the first application using preferences specific to the authenticated user.

In another example, a computing device is presented, comprising: a touch-sensitive user interface configured to present a unified collaborative session for two or more users; an authentication module configured to simultaneously identify and authenticate multiple users physically co-located within a collaborative environment comprising the touch-sensitive user interface; a content module configured to allow each authenticated user to access, retrieve, and present user-owned content files within the unified collaborative session via a content portal; and a profile supervisor configured to determine each authenticated user's status relative to the collaborative environment, and further configured to adjust access to each authenticated user's content portal based on the authenticated user's status. In such an example, or any other example, each authenticated user's status relative to the collaborative environment may additionally or alternatively include each authenticated user's physical distance relative to the touch-sensitive user interface. In any of the preceding examples, or any other example, each authenticated user's status relative to the collaborative environment may additionally or alternatively include the authenticated user's orientation to the touch-sensitive user interface. In any of the preceding examples, or any other example, each authenticated user's status relative to the collaborative environment may additionally or alternatively include the authenticated user's physical location relative to the collaborative environment. In any of the preceding examples, or any other example, adjusting access to each authenticated user's content portal may additionally or alternatively include adjusting permissions for user-owned content files presented on the touch-sensitive user interface. In any of the preceding examples, or any other example, adjusting permissions for user-owned content files presented on the touch-sensitive user interface may additionally or alternatively include removing editing permissions for all other authenticated users.

In yet another example, a computing device is presented, comprising: a touch-sensitive user interface configured to present a unified collaborative session for two or more users; an authentication module configured to simultaneously identify and authenticate multiple users physically located within a collaborative environment comprising the user interface; a content module configured to allow an authenticated user to access, retrieve, and present user-owned content files within the unified collaborative session via a content portal; and a roster module configured to indicate a list of authenticated users for a unified collaborative session, and to enable an authenticated user to simultaneously distribute one or more user-owned content files to each authenticated user for the unified collaborative session. In such an example, or any other example, the roster module may additionally or alternatively be configured to indicate a prospective roster in advance of the unified collaborative session, and wherein the authentication module is further configured to load authentication profiles onto the computing device for each member of the prospective roster in advance of the unified collaborative session. In any of the preceding examples, or any other example, may additionally or alternatively be further configured to enable members of the prospective roster to load user-owned content files onto the computing device in advance of the unified collaborative session. In any of the preceding examples, or any other example, indicating authenticated users for a unified collaborative session may additionally or alternatively include presenting a visual roster at the touch-sensitive user interface. In any of the preceding examples, or any other example, user-owned content files may additionally or alternatively be distributed to authenticated users following the unified collaborative session based on the visual roster. In any of the preceding examples, or any other example, user-owned content files may additionally or alternatively be distributed to authenticated users based on an interaction between a content file owner and the visual roster. In any of the preceding examples, or any other example, the roster module may additionally or alternatively be configured to allow an authenticated user to adjust the list of authenticated users for the unified collaborative session.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a touch-sensitive user interface implemented via a touch sensor, the touch-sensitive user interface configured to present a unified collaborative session for two or more users;
   an authentication module configured to simultaneously identify and authenticate multiple users physically co-located within a collaborative environment such that each of the multiple users can touch interact with the touch-sensitive user interface; and
   a content module configured to simultaneously provide one or more content portals within the unified collaborative session for each authenticated user, each content portal configured to enable an authenticated user to access, retrieve, and present user-owned content files within the unified collaborative session, wherein a first authenticated user may push a user-owned content file to a second authenticated user, so that both the first and second authenticated users may simultaneously interact with one user-owned content file within their own content portal, wherein the second authenticated user has limited permissions pertaining to the user-owned content file as compared to the first authenticated user, and wherein the permissions assigned to the second authenticated user are adjusted over three or more levels of permission based on a gradated status assigned to the first authenticated user.

2. The computing device of claim 1, wherein the first and second authenticated users may simultaneously interact with different versions of the same user-owned content file.

3. The computing device of claim 2, wherein the different versions of the same user-owned content file are merged following the unified collaborative session.

4. The computing device of claim 1, wherein edits to the user-owned content file are associated with each authenticated user.

5. The computing device of claim 1, wherein each authenticated user opens a first application within the content portal, and operates the first application using preferences specific to the authenticated user.

6. The computing device of claim 1, wherein the three or more levels of permission include at least: maintaining the user-owned content file, greying out the user-owned content file, locking the user-owned content file, and shifting the user-owned content file to read-only status.

7. A computing device, comprising:
   a touch-sensitive user interface implemented via a touch sensor, the touch-sensitive user interface configured to present a unified collaborative session for two or more authenticated users;
   a content module configured to allow each authenticated user to access, retrieve, and present user-owned content files within the unified collaborative session via a content portal; and
   a profile supervisor configured to assign a gradated status to the authenticated user based on the user's status relative to a collaborative environment, and further configured to adjust access to each authenticated user's content portal based on the authenticated user's gradated status, wherein adjusting access to each authenticated user's content portal includes adjusting permissions for user-owned content files presented on the touch-sensitive user interface within other user's content portals over three or more levels of permission based on the gradated status assigned to the authenticated user.

8. The computing device of claim 7, wherein each authenticated user's status relative to the collaborative environment includes the authenticated user's physical distance relative to the touch-sensitive user interface.

9. The computing device of claim 7, wherein each authenticated user's status relative to the collaborative environment includes the authenticated user's orientation to the touch-sensitive user interface.

10. The computing device of claim 7, wherein each authenticated user's status relative to the collaborative environment includes the authenticated user's physical location relative to the collaborative environment.

11. The computing device of claim 7, wherein adjusting access to each authenticated user's content portal includes adjusting permissions for user-owned content files presented on the touch-sensitive user interface within other user's content portals.

12. The computing device of claim 1, wherein adjusting permissions for user-owned content files presented on the touch-sensitive user interface includes removing editing permissions for all other authenticated users.

13. The computing device of claim 7, wherein adjusting access to each authenticated user's content portal includes adjusting access over three or more levels of access, the three or more levels of access including at least: maintaining the authenticated user's content portal, greying out the authenticated user's content portal, locking the authenticated user's content portal, and shifting the user's content portal to read-only status.

14. A computing device, comprising:
- a touch-sensitive user interface implemented via a touch sensor, the touch-sensitive user interface configured to present a unified collaborative session for two or more users;
- an authentication module configured to simultaneously identify and authenticate multiple users physically located within a collaborative environment comprising the touch-sensitive user interface;
- a content module configured to allow each authenticated user to access, retrieve, and present user-owned content files within the unified collaborative session via a content portal presented on the touch-sensitive user interface, such that two or more content portals may be concurrently displayed on the touch-sensitive user interface; and
- a roster module configured to indicate a list of authenticated users for a unified collaborative session, and to enable an authenticated user to simultaneously distribute one or more user-owned content files to each authenticated user for the unified collaborative session so that each authenticated user may simultaneously interact with the one or more user-owned content files within their own content portal presented on the touch-sensitive user interface, such that multiple copies of the same user-owned content file may be concurrently displayed in and simultaneously edited within different content portals on the touch-sensitive user interface.

15. The computing device of claim 14, wherein the roster module is configured to indicate a prospective roster in advance of the unified collaborative session, and wherein the authentication module is further configured to load authentication profiles onto the computing device for each member of the prospective roster in advance of the unified collaborative session.

16. The computing device of claim 14, wherein the roster module is further configured to enable members of the prospective roster to load user-owned content files onto the computing device in advance of the unified collaborative session.

17. The computing device of claim 14, wherein indicating authenticated users for a unified collaborative session includes presenting a visual roster at the touch-sensitive user interface.

18. The computing device of claim 17, wherein user-owned content files are distributed to authenticated users following the unified collaborative session based on the visual roster.

19. The computing device of claim 17, wherein user-owned content files are distributed to authenticated users based on an interaction between a content file owner and the visual roster.

20. The computing device of claim 14, wherein the roster module is configured to allow an authenticated user to adjust the list of authenticated users for the unified collaborative session.

* * * * *